United States Patent
Qiu et al.

(10) Patent No.: US 12,537,875 B2
(45) Date of Patent: Jan. 27, 2026

(54) INTERNET OF VEHICLE SERVICE ACTIVATION METHOD, AND COMPUTER DEVICE, AND STORAGE MEDIUM

(71) Applicant: GUANGZHOU AUTOMOBILE GROUP CO., LTD., Guangzhou (CN)

(72) Inventors: Xinglong Qiu, Guangzhou (CN); Hongming Du, Guangzhou (CN); Jijie Gu, Guangzhou (CN); Ziping Zheng, Guangzhou (CN); Dongbao You, Guangzhou (CN); Hongliang Fei, Guangzhou (CN)

(73) Assignee: Guangzhou Automobile Group Co., Ltd., Guangdong (CN)

( * ) Notice: Subject to any disclaimer, the term of this patent is extended or adjusted under 35 U.S.C. 154(b) by 692 days.

(21) Appl. No.: 17/756,749

(22) PCT Filed: May 27, 2021

(86) PCT No.: PCT/CN2021/096372
§ 371 (c)(1),
(2) Date: Jun. 1, 2022

(87) PCT Pub. No.: WO2022/041887
PCT Pub. Date: Mar. 3, 2022

(65) Prior Publication Data
US 2022/0417328 A1     Dec. 29, 2022

(30) Foreign Application Priority Data

Aug. 28, 2020   (CN) .......................... 202010886392.1

(51) Int. Cl.
*H04L 67/12*   (2022.01)
*H04L 67/125*   (2022.01)

(52) U.S. Cl.
CPC ................................ *H04L 67/125* (2013.01)

(58) Field of Classification Search
CPC ....... H04L 67/125; H04L 63/00; H04L 67/12; H04L 63/08; Y02D 30/70
See application file for complete search history.

(56) References Cited

U.S. PATENT DOCUMENTS 9,865,110 B2 * 1/2018 Link, II ................. H04L 63/08
2012/0259480 A1  10/2012 Huo et al.
(Continued)

FOREIGN PATENT DOCUMENTS

CN           102571886 A    *  7/2012
CN           103029648 A    *  4/2013
(Continued)

OTHER PUBLICATIONS

First Office Action mailed to Corresponding Patent Application No. 202010886392.1 on Jul. 5, 2022.
(Continued)

*Primary Examiner* — Eyob Hagos
(74) *Attorney, Agent, or Firm* — Rosenberg, Klein & Lee (57) ABSTRACT

An Internet of Vehicles service activation method comprises: receiving first vehicle information of a vehicle to be activated, which is sent by a mobile terminal; when the received first vehicle information is comprised in a vehicle information database, sending an activation request message to the mobile terminal and starting a countdown of a preset time period; when a vehicle-started event sent by a vehicle-mounted terminal is received before the end of the countdown, extracting, from the vehicle-started event, second vehicle information corresponding to the vehicle-mounted terminal; and when the first vehicle information is the same as the second vehicle information, activating an Internet of Vehicles service of the vehicle to be activated.

14 Claims, 5 Drawing Sheets

(56) References Cited

U.S. PATENT DOCUMENTS

| | | | | |
|---|---|---|---|---|
| 2016/0344747 | A1* | 11/2016 | Link, II | G06F 21/35 |
| 2018/0322721 | A1 | 11/2018 | Hu et al. | |
| 2019/0297476 | A1* | 9/2019 | Zhao | H04W 48/18 |
| 2020/0102926 | A1* | 4/2020 | Jaggi | H04W 4/40 |
| 2020/0193749 | A1* | 6/2020 | Link | H04L 67/12 |

FOREIGN PATENT DOCUMENTS

| | | | | |
|---|---|---|---|---|
| CN | 107615291 A | | 1/2018 | |
| CN | 108382397 A | | 8/2018 | |
| CN | 109726528 A | | 5/2019 | |
| CN | 211718727 U | * | 10/2020 | |
| EP | 3116197 A1 | | 1/2017 | |
| JP | 2021131824 A | * | 9/2021 | |
| WO | WO-2020083258 A1 | * | 4/2020 | G07C 5/00 |

OTHER PUBLICATIONS

Second Office Action mailed to Corresponding Patent Application No. 202010886392.1 on Dec. 13, 2022.

\* cited by examiner

Client    Server    Vehicle

INTERNET OF VEHICLE SERVICE ACTIVATION METHOD, AND COMPUTER DEVICE, AND STORAGE MEDIUM

CROSS-REFERENCE TO RELATED APPLICATIONS

This application is a 371 of International Application No. PCT/CN2021/096372, filed May 27, 2021, which is based upon and claims priority to Chinese Patent Application No. 202010886392.1, filed Aug. 28, 2020, the entire contents of which are incorporated herein by reference.

TECHNICAL FIELD

The present application relates to the technical field of vehicles, and more particularly, to an Internet of Vehicles service activation method, a device, a computer device and a storage medium.

BACKGROUND

In recent years, with a development of the Internet of Vehicles technology, more and more vehicles have been connected to the Internet and users, enabling vehicle owners to remotely control a vehicle, such as remotely turning on an air conditioner through a mobile Application (APP). A traditional method of activating the Internet of Vehicles service is that the user enters vehicle information such as Vehicle Identification Number (VIN) or an engine number on the APP to activate the Internet of Vehicles service, and the vehicle can be remotely controlled after activating the Internet of Vehicles service.

The inventor realizes that the current activation method has certain security risks, and fails to ensure that the user who activates the Internet of Vehicles service is a vehicle owner. When the user's vehicle information is leaked, the vehicle may be maliciously bound by others. Thus, how to avoid a leakage of vehicle information and a malicious binding by others has become an urgent problem to be solved.

SUMMARY

There are provided an Internet of Vehicles service activation method, a device, a computer device and a storage medium according to embodiments of the present disclosure. The technical solution is as below:

According to a first aspect of embodiments of the present disclosure, there is provided an Internet of Vehicles service activation method, applied to a TSP server, comprising:
  receiving a first vehicle information of a vehicle to be activated sent by a mobile terminal;
  sending an activation request message to the mobile terminal and starting a countdown of a preset time period, when a vehicle information database comprises the received first vehicle information;
  extracting a second vehicle information corresponding to a vehicle mounted terminal from a vehicle-started event, when receiving the vehicle-started event sent by the vehicle mounted terminal before an end of the countdown; and
  activating the Internet of Vehicles service of the vehicle to be activated, when the first vehicle information is the same as the second vehicle information.

According to a second aspect of embodiments of the present disclosure, there is provided an Internet of Vehicles service activation device, comprising:
  an information receiving module configured to receive a first vehicle information of a vehicle to be activated sent by a mobile terminal;
  a message sending module configured to send an activation request message to the mobile terminal and starting a countdown of a preset time period, when a vehicle information database comprises the received first vehicle information;
  an information extracting module configured to extract a second vehicle information corresponding to a vehicle mounted terminal from a vehicle-started event, when receiving the vehicle-started event sent by the vehicle mounted terminal before an end of the countdown; and
  an activation module configured to activate the Internet of Vehicles service of the vehicle to be activated, when the first vehicle information is the same as the second vehicle information.

According to a third aspect of embodiments of the present disclosure, there is provided a computer device, comprising:
  a memory;
  a processor; and
  computer-readable instructions stored in the memory and executable on the processor;
  wherein when the processor executes the computer-readable instructions, following steps are performed:
  receiving a first vehicle information of a vehicle to be activated sent by a mobile terminal;
  sending an activation request message to the mobile terminal and starting a countdown of a preset time period, when a vehicle information database comprises the received first vehicle information;
  extracting a second vehicle information corresponding to a vehicle mounted terminal from a vehicle-started event, when receiving the vehicle-started event sent by the vehicle mounted terminal before an end of the countdown; and
  activating the Internet of Vehicles service of the vehicle to be activated, when the first vehicle information is the same as the second vehicle information.

According to a fourth aspect of embodiments of the present disclosure, there is provided a non-volatile readable storage medium having stored therein computer-readable instructions, wherein when the computer-readable instructions are executed by one or more processor, the one or more processor performs the following steps:
  receiving a first vehicle information of a vehicle to be activated sent by a mobile terminal;
  sending an activation request message to the mobile terminal and starting a countdown of a preset time period, when a vehicle information database comprises the received first vehicle information;
  extracting a second vehicle information corresponding to a vehicle mounted terminal from a vehicle-started event, when receiving the vehicle-started event sent by the vehicle mounted terminal before an end of the countdown; and
  activating the Internet of Vehicles service of the vehicle to be activated, when the first vehicle information is the same as the second vehicle information.

The details of one or more embodiments of the present application are set forth in the accompanying drawings and the description below, and other features and advantages of the present application will become apparent from the description, drawings, and claims.

BRIEF DESCRIPTION OF THE DRAWINGS

In order to illustrate technical solutions of embodiments of the present application more clearly, the drawings that are used in the description of the embodiments of the present application will be introduced briefly as follows. Obviously, the drawings in the following description are only some embodiments of the present application, for those of ordinary skill in the art, other drawings may also be obtained from these drawings without creative labor.

DETAILED DESCRIPTION

The technical solutions in the embodiments of the present application will be clearly and completely described below with reference to the accompanying drawings in the embodiments of the present application. Obviously, the described embodiments are part of the embodiments of the present application, not all of the embodiments. Based on the embodiments in the present application, all other embodiments obtained by those of ordinary skill in the art without creative work fall within the protection scope of the present application.

Figure 1:
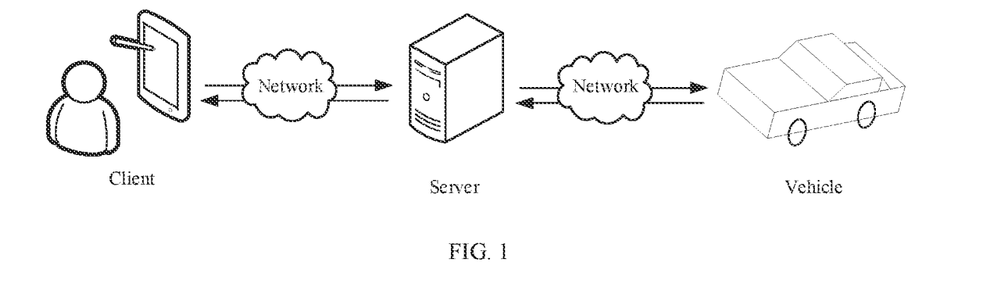
FIG. 1 illustrates a diagram of an application environment of an Internet of Vehicles service activation method according to an embodiment of the present application.

The present application provides an Internet of Vehicles service activation method, which may be applied in an application environment shown in FIG. 1. A server is communicated with a mobile terminal and a vehicle mounted terminal in the vehicle through a network. The mobile terminal includes but is not limited to personal computer, notebook computer, smart phone, tablet computer and portable wearable device. The server may be an independent server or a server cluster composed of multiple servers, such as a Telematics Service Provider (TSP) server. The vehicle is equipped with a vehicle mounted terminal Telematics BOX (T-BOX), which is also configured to communicate with the Vehicle control unit (VCU) inside the vehicle.

Figure 2:
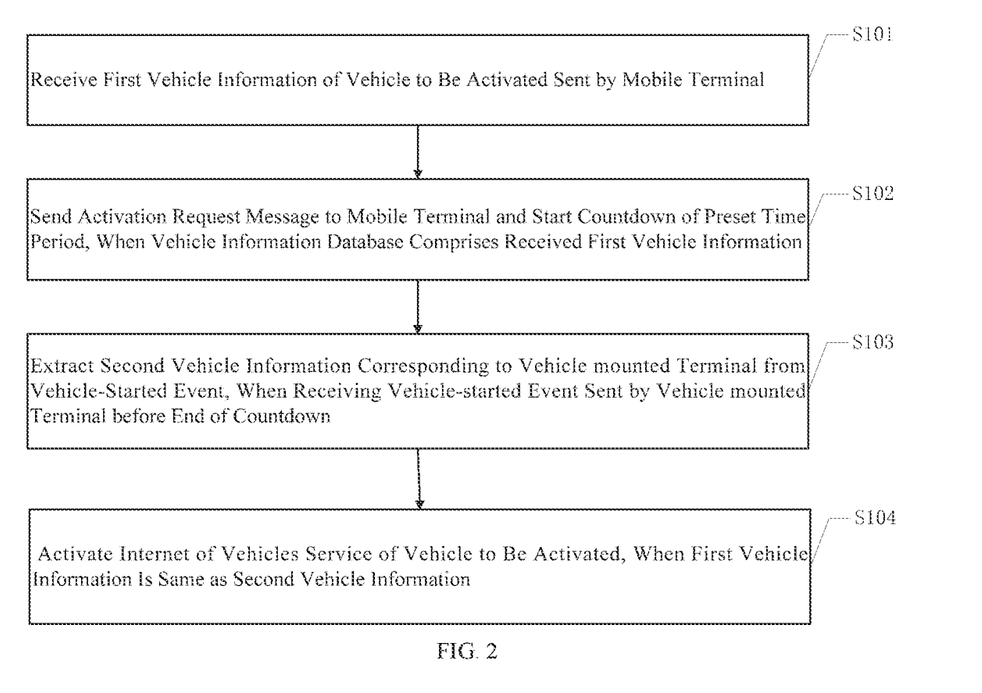
FIG. 2 is a flowchart of the Internet of Vehicles service activation method according to an embodiment of the present application.

In an embodiment, as shown in FIG. 2, an Internet of Vehicles service activation method is provided, and the method is applied to the server in FIG. 1 as an example for description, including the following steps S101 to S104.

S101: a first vehicle information of a vehicle to be activated sent by a mobile terminal is received.

In some embodiments, the mobile terminal is installed with an application, and the user can bind a registered account of the application with the first vehicle information on the mobile terminal. When a network service of the vehicle needs to be activated, the user can perform an activation operation on the APP of the mobile terminal. The mobile terminal sends the first vehicle information of the vehicle to a local server through the application, and the server is specifically configured to receive the first vehicle information of the vehicle to be activated sent by the mobile terminal through a pre-installed and registered application.

The first vehicle information includes but is not limited to a Vehicle Identification Number (VIN) and an engine number.

S102: when a vehicle information database includes the received first vehicle information, an activation request message is sent to the mobile terminal and a countdown of a preset time period is started.

In one embodiment, the preset time period is, for example, 3 minutes. The vehicle information database of the local server stores all the vehicle information of a real vehicle. When the vehicle information database includes the received first vehicle information, it is indicated that the first vehicle information is the vehicle information of the real vehicle, and an activation request message is sent to the mobile terminal.

S103: when receiving a vehicle-started event sent by a vehicle mounted terminal before an end of the countdown, a second vehicle information corresponding to the vehicle mounted terminal is extracted from the vehicle-started event.

According to a usage scenario of this embodiment, for example, when seeing the activation request message on the application of the mobile terminal, the user starts the vehicle. The vehicle sends a start event to the local server during a start-up process. When the vehicle-started event sent by the vehicle mounted terminal is received before the end of the countdown (3 minutes), the second vehicle information corresponding to the vehicle mounted terminal is extracted from the vehicle-started event.

S104: when the first vehicle information is the same as the second vehicle information, the Internet of Vehicles service of the vehicle to be activated is activated.

When the first vehicle information is the same as the second vehicle information, it may be indicated that the user who activates the Internet of Vehicles service is the vehicle owner himself.

In some embodiments, after the step of step S104, the Internet of Vehicles service activation method further includes the following step.

A prompt message of activation success is sent to the application installed on the mobile terminal, so that the user can know the activation result in time.

In some embodiments, the Internet of Vehicles service activation method further includes the following step.

When the first vehicle information is different from the second vehicle information, a prompt message of activation failure is sent to the application installed on the mobile terminal.

Figure 4:
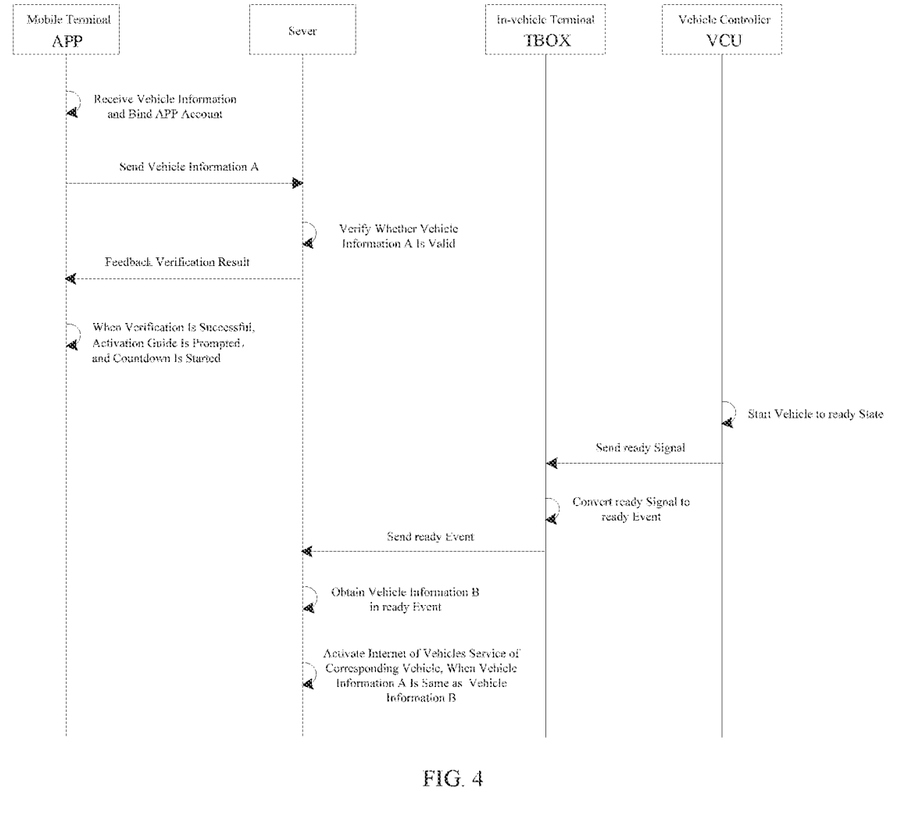
FIG. 4 illustrates an interactive flowchart of the Internet of Vehicles service activation method according to an embodiment of the present application.

FIG. 4 illustrates an interactive flowchart of the Internet of Vehicles service activation method according to an embodiment of the present application. A usage scenario of the Internet of Vehicles service activation method according to the embodiment is described in detail below with reference to FIG. 4. As shown in FIG. 4, the mobile terminal is provided with an APP for the Internet of Vehicles service. The user registers the APP on the mobile terminal, and binds the registered APP account with the vehicle information (the VIN code and/or the engine number). When it is needed to activate the Internet of Vehicles service, the vehicle information A is sent to the local server through the APP. When the local server receives the vehicle information A, it verifies whether the vehicle information A is valid by comparing with the vehicle information database, and the verification result is sent to the mobile terminal. When the verification is successful, an activation guide is prompted, so as to prompt the user that the verification is successful and the activation can begin, and the countdown is started. When the user sees the activation guide and starts the vehicle, the vehicle controller VCU detects a ready signal of the vehicle, and transmits the ready signal to the vehicle terminal T-BOX through a Controller Area Network (CAN) bus. The vehicle terminal T-BOX converts the ready signal into a ready event, and sends the ready event to the local server. The local server obtains the vehicle information B carried in the ready event. When the vehicle information A is the same as the vehicle information B, the Internet of Vehicles service of the corresponding vehicle is activated.

During the vehicle information verification, the local TSP server verifies whether the vehicle information uploaded by the APP installed on the mobile terminal is true and valid, and whether the vehicle information database includes the vehicle information. If there is no such vehicle information, the result is fed back to the APP installed on the mobile terminal, the APP displays that there is no vehicle information. If there is the vehicle information, the result is fed back to the APP, and the APP displays an activation guide interface, and prompts the user to enter the vehicle and start the vehicle to the ready state within 3 minutes.

In the Internet of Vehicles service activation method, when receiving the first vehicle information of the vehicle to be activated sent by the mobile terminal, whether the local vehicle information database comprises the first vehicle information is determined. If yes, it is indicated that the first vehicle information is valid vehicle information. An activation request message is sent to the mobile terminal and the countdown of the preset time period is started. If the vehicle-started event sent by the vehicle terminal is received before the end of the countdown, the second vehicle information corresponding to the vehicle terminal is extracted from the vehicle-started event. When the first vehicle information is the same as the second vehicle information, it is indicated that the user who activates the Internet of Vehicles service is the vehicle owner. The Internet of Vehicles service of the vehicle to be activated is activated, thereby avoiding the problem that the vehicle information of the vehicle owner is leaked, and the vehicle is maliciously bound by others.

Figure 3:
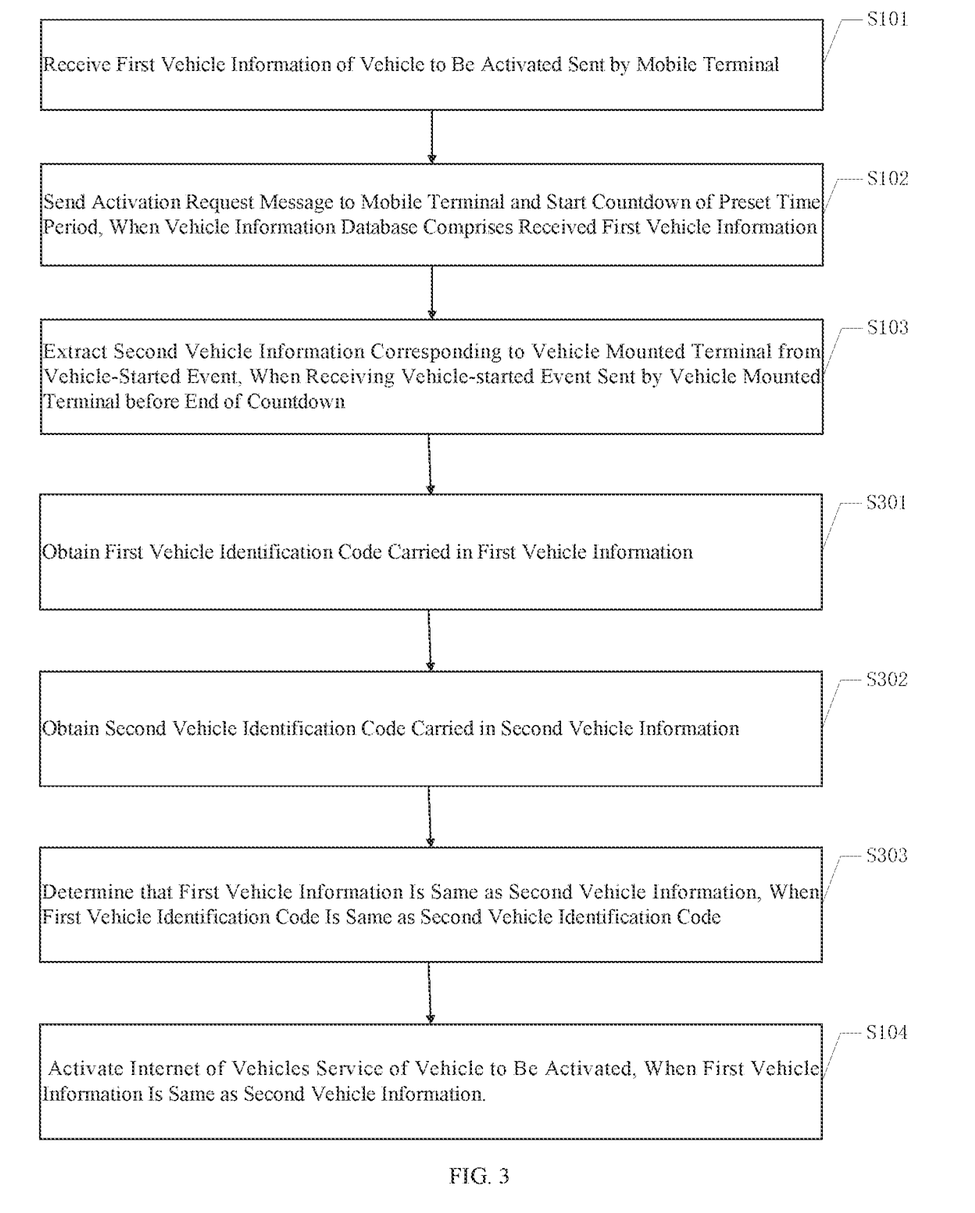
FIG. 3 is a flowchart of the Internet of Vehicles service activation method according to another embodiment of the present application.

FIG. 3 is a flowchart of the Internet of Vehicles service activation method according to another embodiment of the present application. As shown in FIG. 3, the Internet of Vehicles service activation method provided by this embodiment, on the basis of including the above S101 to S104, further includes the following steps S301 to S303.

S301: a first vehicle identification code carried in the first vehicle information is obtained. The first vehicle identification code is the first VIN code.

S302: a second vehicle identification code carried in the second vehicle information is obtained. The second vehicle identification code is the second VIN code.

S303: when the first vehicle identification code is the same as the second vehicle identification code, it is determined that the first vehicle information is the same as the second vehicle information.

In other embodiments, the engine number may also be used as a criterion for determining whether the first vehicle information is the same as the second vehicle information.

In some embodiments, the Internet of Vehicles service activation method further includes the following steps.

When the vehicle information database does not include the received first vehicle information, a verification failure message is sent to the application installed on the mobile terminal.

When the vehicle information database includes the received first vehicle information, an activation request message is sent to the application installed on the mobile terminal.

In this embodiment, the verification result of the authenticity verification of the first vehicle information is sent to the application installed on the mobile terminal, which is convenient for the user to know the verification result of the vehicle information in time, so that the users can know the verification result and correct the vehicle information in time when they enter the wrong vehicle information by mistake.

When the user activates the Internet of Vehicles service, the vehicle information input by the user is matched with the vehicle that the user has the right to operate. On the basis of determining the authenticity and validity of the vehicle information, determining whether the user has right to operate (which may be unlocked with the physical key to enter the vehicle and start the vehicle) is added, so as to improve the activation of the Internet of Vehicles service.

It should be understood that the sequence numbers of the steps in the above-mentioned embodiments does not mean an execution sequence, and the execution sequence of each process should be determined by its function and internal logic, and should not constitute any limitation to the implementation process of the embodiments of the present application.

Figure 5:
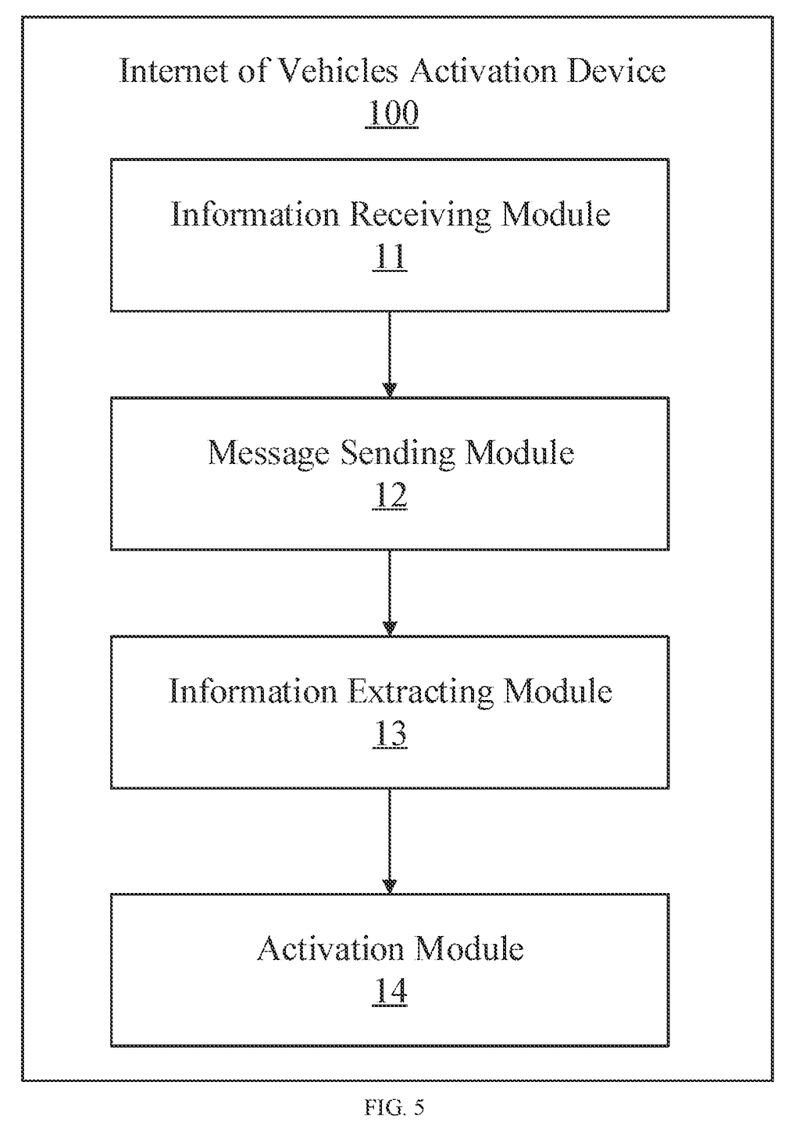
FIG. 5 is a schematic structural diagram of an Internet of Vehicles service activation device according to an embodiment of the present application.

In one embodiment, an Internet of Vehicles service activation device is provided, and the Internet of Vehicles service activation device corresponds one-to-one with the Internet of Vehicles service activation method in the above-mentioned embodiment. As shown in FIG. 5, the Internet of Vehicles service activation device 100 includes an information receiving module 11, a message sending module 12, an information extracting module 13 and an activation module 14. A detailed description of each functional module is as follows.

The information receiving module 11 is configured to receive a first vehicle information of a vehicle to be activated sent by a mobile terminal.

In some embodiments, the mobile terminal is installed with an application, and the user can bind a registered account of the application with the first vehicle information on the mobile terminal. When the Internet of Vehicles service needs to be activated, the user can perform an activation operation on the APP of the mobile terminal, and the mobile terminal sends the first vehicle information of the vehicle to the local server through the application. The server is specifically configured to receive the first vehicle information of the vehicle to be activated sent by the mobile terminal through the pre-installed and registered application.

The first vehicle information includes but is not limited to a Vehicle Identification Number (VIN) and an engine number of the vehicle.

The message sending module 12 is configured to send an activation request message to the mobile terminal and start a countdown of a preset time period when a vehicle information database includes the received first vehicle information.

In one embodiment, the preset time period is, for example, 3 minutes. The vehicle information database of the local server stores all the vehicle information of a real vehicle. When the vehicle information database includes the received first vehicle information, it is indicated that the first vehicle information is the vehicle information of the real vehicle, and an activation request message can be sent to the mobile terminal.

The information extracting module 13 is configured to extract second vehicle information corresponding to a vehicle mounted terminal from a vehicle-started event when the vehicle-started event sent by the vehicle mounted terminal is received before an end of countdown.

According to a usage scenario of this embodiment, for example, when seeing the activation request message on the application of the mobile terminal, the user starts the vehicle. The vehicle sends a start event to a local server during a start-up process. When the vehicle-started event sent by the vehicle mounted terminal is received before the end of the countdown (3 minutes), the second vehicle information corresponding to the vehicle mounted terminal is extracted from the vehicle-started event.

The activation module 14 is configured to activate the Internet of Vehicles service of the vehicle to be activated when the first vehicle information is the same as the second vehicle information.

In one embodiment, the activation device 100 for the Internet of Vehicles service further includes:
- a first obtaining module configured to obtain the first vehicle identification code carried in the first vehicle information;
- a second obtaining module configured to obtain the second vehicle identification code carried in the second vehicle information; and
- a determining module configured to determine that the first vehicle information is the same as the second vehicle information when the first vehicle identification code is the same as the second vehicle identification code.

In one embodiment, the information receiving module 11 is specifically configured to receive the first vehicle information of the vehicle to be activated sent by the mobile terminal through a pre-installed and registered application.

In one embodiment, the Internet of Vehicles service activation device 100 further includes:
- a first sending unit configured to send a verification failure message to an application installed on the mobile terminal when the vehicle information database does not include the received first vehicle information; and
- a second sending unit configured to send an activation request message to the application installed on the mobile terminal when the vehicle information database includes the received first vehicle information.

In some embodiments, the Internet of Vehicles service activation device 100 further includes:
- a third sending unit configured to send a prompt message of activation success to the application installed on the mobile terminal.

In some embodiments, the Internet of Vehicles service activation device 100 further includes:
- a fourth sending unit configured to send a prompt message of activation failure to the application installed on the mobile terminal when the first vehicle information is different from the second vehicle information.

The meanings of "first" and "second" in the above modules/units are only to distinguish different modules/units, and are not used to define which module/unit has a higher priority or other limiting meanings. Furthermore, the terms "comprise" and "have", and any variations thereof, are intended to cover non-exclusive inclusion. For example, a process, method, system, product or device comprising a series of steps or modules is not necessarily limited to those expressly listed steps or modules, but may include other steps or modules not explicitly listed or inherent to the process, method, product or device. A division of modules appearing in this application is only a logical division, and there may be other division methods when implementing in practical applications.

A specific limitation of the Internet of Vehicles service activation device may refer to a definition of the above-mentioned Internet of Vehicles service activation method, which will not be repeated herein. Each module in the above-mentioned Internet of Vehicles service activation device may be implemented in whole or in part by software, hardware, and combinations thereof. The above-mentioned modules may be embedded in or independent of a processor in the computer device in the form of hardware, or stored in the memory in the computer device in the form of software, so that the processor can call and execute the operations corresponding to the above modules.

Figure 6:
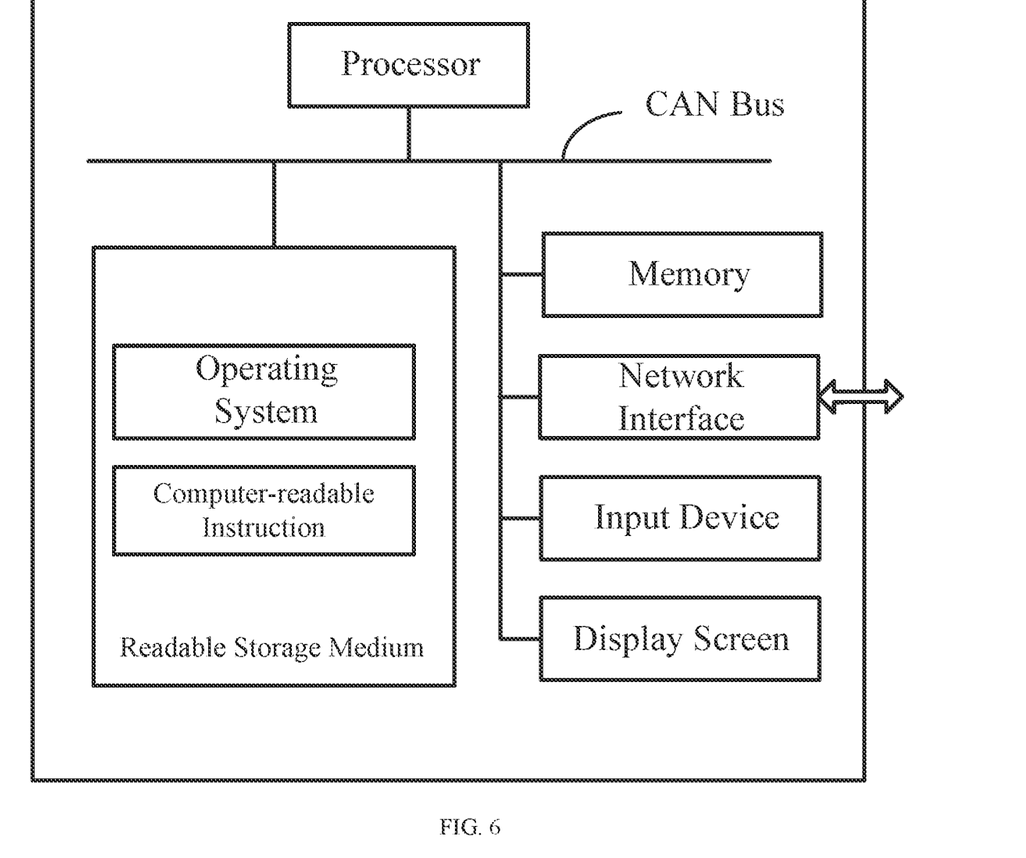
FIG. 6 illustrates a schematic diagram of a computer device according to an embodiment of the present application.

In one embodiment, provided is a computer device, which may be a server, and an internal structure diagram of which may be as shown in FIG. 6. The computer device includes a processor, memory, a network interface, and a database connected by a system bus. The processor of the computer device is configured to provide computing and control capabilities. The memory of the computer device includes a readable storage medium, an internal memory. The readable storage medium stores an operating system, computer readable instructions and a database. The internal memory provides an environment for the execution of the operating system and the computer-readable instructions in the readable storage medium. The database of the computer device is configured to store data involved in the Internet of Vehicles service activation method. The network interface of the computer device is configured to communicate with an external terminal through a network connection. When the computer-readable instructions executed by the processor, the Internet of Vehicles service activation method is realized. The readable storage medium provided by this embodiment includes a non-volatile readable storage medium and a volatile readable storage medium.

In one embodiment, provided is a computer device, including a memory, a processor, and computer-readable instructions stored in the memory and executable on the processor. When the processor executes the computer-readable instructions, the steps of the Internet of Vehicles service activation method in the above-mentioned embodiment are implemented, such as, steps 101 to 104 shown in FIG. 2, other extensions of the method and extensions of related steps. Alternatively, when the processor executes the computer-readable instructions, the functions of each module/unit of the Internet of Vehicles service activation device in the above-mentioned embodiment are implemented, such as, the functions of modules 11 to 14 shown in FIG. 5, which will not repeat herein to avoid repetition.

The processor may be a Central Processing Unit (CPU), other general-purpose processors, a Digital Signal Processor (DSP), an Application Specific Integrated Circuit (ASIC), a Field-Programmable Gate Array (FPGA) or other programmable logic devices, discrete gate or transistor logic devices or discrete hardware components. The general-purpose processor may be a microprocessor, or the processor may also be any conventional processor. The processor is a control center of the computer device, which is connected to various parts of the entire computer device by various interfaces and lines.

The memory may be configured to store the computer-readable instructions and/or modules, and the processor may execute or perform the computer-readable instructions and/or modules stored in the memory and recall the data stored in the memory, so as to implement various functions of the computer device. The memory may mainly include a stored program area and a stored data area. The stored program area may store an operating system, an application program required for at least one function (e.g., a sound playback function, an image playback function). The storage data area may store data created according to the usage of the mobile phone (e.g., audio data, video data).

The memory may be integrated in the processor, or may be provided separately from the processor.

In one embodiment, provided is one or more readable storage medium having stored therein computer-readable instructions, and the readable storage medium provided in this embodiment include a non-volatile readable storage medium and a volatile readable storage media medium. The computer-readable instructions are stored on the readable storage medium, and when the computer-readable instructions are executed by one or more processor, the one or more processor implements the steps of the Internet of Vehicles service activation method in the above-mentioned embodiment, such as steps 101 to 104 shown in FIG. 2, other extensions of the method and extensions of related steps. Alternatively, when the computer readable instructions are executed by the processor, the functions of each module/unit of the Internet of Vehicles service activation device the in the above-mentioned embodiment are implemented, such as, the functions of modules 11 to 14 shown in FIG. 5, which will not repeat herein to avoid repetition.

In the Internet of Vehicles service activation method, the device, the computer device and the storage medium proposed in this embodiment, when receiving the first vehicle information of the vehicle to be activated sent by the mobile terminal, whether the local vehicle information database comprises the first vehicle information is determined. If yes, it is indicated that the first vehicle information is valid vehicle information. An activation request message is sent to the mobile terminal and a countdown of the preset time period is started. If the vehicle-started event sent by the vehicle terminal is received before an end of the countdown, the second vehicle information corresponding to the vehicle terminal is extracted from the vehicle-started event. When the first vehicle information is the same as the second vehicle information, it is indicated that the user who activates the Internet of Vehicles service is the vehicle owner. The Internet of Vehicles service of the vehicle to be activated is activated, thereby avoiding the problem that the vehicle information of the vehicle owner is leaked, and the vehicle is maliciously bound by others.

Those of ordinary skill in the art can understand that all or part of the processes in the methods of the above-mentioned embodiments may be implemented by instructing the relevant hardware by a computer-readable instruction, wherein the computer-readable instruction may be stored in a non-volatile computer readable storage medium. When the computer-readable instruction is executed, the processes of the above-described method embodiments may be performed. Any reference to a memory, storage, database, or other medium used in the various embodiments provided herein may include non-volatile and/or volatile memory. The non-volatile memory may include Read Only Memory (ROM), Programmable ROM (PROM), Electrically Programmable ROM (EPROM), Electrically Erasable Programmable ROM (EEPROM), or flash memory. The volatile memory may include Random Access Memory (RAM) or external cache EPS memory. In way of illustration and not limitation, RAM is available in various forms such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM), Rambus direct RAM (RDRAM), Direct Rambus Dynamic RAM (DRDRAM), and Rambus Dynamic RAM (RDRAM).

Those skilled in the art can clearly understand that, for the convenience and simplicity of description, the division of the above-mentioned functional units and modules is only used as an example for illustration. In practical applications, the above-mentioned functions may be completed by different functional units or modules, that is, an internal structure of the device is divided into different functional units or modules to complete all or part of the functions described above.

The above-mentioned embodiments are only used to illustrate the technical solutions of the present application, but not to limit them. Although the present application has been described in detail with reference to the above-mentioned embodiments, those of ordinary skill in the art should understand that: it is still possible to modify the technical solutions recorded in the above-mentioned embodiments, or perform equivalent replacements to some of the technical features, and these modifications or replacements do not make the essence of the corresponding technical solutions deviate from the spirit of the technical solutions in the embodiments of the present application, and shall be included within the protection scope of the present application.

What is claimed is:

1. An Internet of Vehicles service activation method, applied to a Telematics Service Provider (TSP) server, comprising:
   receiving a first vehicle information of a vehicle to be activated sent by a mobile terminal through a pre-installed and registered application;
   sending an activation request message to the mobile terminal and starting a countdown of a preset time period, wherein a vehicle information database includes the received first vehicle information;
   extracting a second vehicle information corresponding to a Telematics BOX (T-BOX) from a vehicle-started event, when receiving the vehicle-started event sent by the T-BOX before an end of the countdown, wherein the vehicle-started event is obtained when the vehicle is started, a vehicle controller (VCU) detects a ready signal of the vehicle, and transmits the ready signal to the T-BOX through a Controller Area Network (CAN) bus, and the T-BOX converts the ready signal into the vehicle-started event, and sends the vehicle-started event to the TSP server;
   activating the Internet of Vehicles service of the vehicle to be activated, when the first vehicle information is the same as the second vehicle information, and
   sending a prompt message of activation failure to the application installed on the mobile terminal, when the first vehicle information is different from the second vehicle information.

2. The Internet of Vehicles service activation method according to claim 1, wherein the first vehicle information carries a first vehicle identification code, and the second vehicle information carries a second vehicle identification code, wherein the method further comprises:
   obtaining the first vehicle identification code carried in the first vehicle information;

obtaining the second vehicle identification code carried in the second vehicle information; and determining that the first vehicle information is the same as the second vehicle information, when the first vehicle identification code is the same as the second vehicle identification code.

3. The Internet of Vehicles service activation method of claim 1, further comprising:

sending a verification failure message to the application installed on the mobile terminal, when the vehicle information database does not include the received first vehicle information; and sending an activation request message to the application installed on the mobile terminal, when the vehicle information database includes the received first vehicle information.

4. The Internet of Vehicles service activation method of claim 1, wherein after activating the Internet of Vehicles service of the vehicle to be activated, the method further comprises:

sending a prompt message of activation success to the application installed on the mobile terminal.

5. The Internet of Vehicles service activation method of claim 1, further comprising:

verifying whether the vehicle information uploaded by the application installed on the mobile terminal is true and valid, and whether the vehicle information database includes the vehicle information; and feeding back results to the application installed on the mobile terminal.

6. The Internet of Vehicles service activation method of claim 1, wherein the first vehicle information includes a Vehicle Identification Number or an engine number.

7. A computer device, comprising:
a memory;
a processor; and
computer-readable instructions stored in the memory and executable on the processor;
wherein when the processor executes the computer-readable instructions, following steps are performed:
receiving a first vehicle information of a vehicle to be activated sent by a mobile terminal through a pre-installed and registered application;
sending an activation request message to the mobile terminal and starting a countdown of a preset time period, wherein a vehicle information database includes the received first vehicle information;
extracting a second vehicle information corresponding to a Telematics BOX (T-BOX) from a vehicle-started event, when receiving the vehicle-started event sent by the T-BOX before an end of the countdown, wherein the vehicle-started event is obtained when the vehicle is started, a vehicle controller (VCU) detects a ready signal of the vehicle, and transmits the ready signal to the T-BOX through a Controller Area Network (CAN) bus, and the T-BOX converts the ready signal into the vehicle-started event, and sends the vehicle-started event to a TSP server;
activating an Internet of Vehicles service of the vehicle to be activated, when the first vehicle information is the same as the second vehicle information, and
sending a prompt message of activation failure to the application installed on the mobile terminal, when the first vehicle information is different from the second vehicle information.

8. The computer device of claim 7, wherein the first vehicle information carries a first vehicle identification code, the second vehicle information carries a second vehicle identification code, and when the processor executes the computer-readable instructions, following steps are further performed:

obtaining the first vehicle identification code carried in the first vehicle information;

obtaining the second vehicle identification code carried in the second vehicle information; and determining that the first vehicle information is the same as the second vehicle information, when the first vehicle identification code is the same as the second vehicle identification code.

9. The computer device of claim 7, wherein when the processor executes the computer-readable instructions, following steps are further performed:

sending a verification failure message to the application installed on the mobile terminal, when the vehicle information database does not include the received first vehicle information; and sending an activation request message to the application installed on the mobile terminal, when the vehicle information database includes the received first vehicle information.

10. The computer device according to claim 7, wherein after activating the Internet of Vehicles service of the vehicle to be activated, a following step is further performed:

sending a prompt message of activation success to the application installed on the mobile terminal.

11. A non-volatile readable storage medium having stored therein computer-readable instructions, wherein when the computer-readable instructions are executed by one or more processors, the one or more processors perform the following steps:

receiving a first vehicle information of a vehicle to be activated sent by a mobile terminal through a pre-installed and registered application;

sending an activation request message to the mobile terminal and starting a countdown of a preset time period, wherein a vehicle information database includes the received first vehicle information;

extracting a second vehicle information corresponding to a Telematics BOX (T-BOX) from a vehicle-started event, when receiving the vehicle-started event sent by the T-BOX before an end of the countdown, wherein the vehicle-started event is obtained when the vehicle is started, a vehicle controller (VCU) detects a ready signal of the vehicle, and transmits the ready signal to the T-BOX through a Controller Area Network (CAN) bus, and the T-BOX converts the ready signal into the vehicle-started event, and sends the vehicle-started event to a TSP server;

activating an Internet of Vehicles service of the vehicle to be activated, when the first vehicle information is the same as the second vehicle information, and sending a prompt message of activation failure to the application installed on the mobile terminal, when the first vehicle information is different from the second vehicle information.

12. The readable storage medium of claim 11, wherein the first vehicle information carries a first vehicle identification code, the second vehicle information carries a second vehicle identification code, and wherein when the computer-readable instructions are executed by the one or more processors, the one or more processors further perform the following steps:

obtaining the first vehicle identification code carried in the first vehicle information;

obtaining the second vehicle identification code carried in the second vehicle information; and determining that the first vehicle information is the same as the second vehicle information, when the first vehicle identification code is the same as the second vehicle identification code.

13. The readable storage medium of claim 11, wherein when the computer-readable instructions are executed by the one or more processors, the one or more processors further perform the following steps:

sending a verification failure message to the application installed on the mobile terminal, when the vehicle information database does not include the received first vehicle information; and sending an activation request message to the application installed on the mobile terminal, when the vehicle information database includes the received first vehicle information.

14. The readable storage medium of claim 11, wherein after activating the Internet of Vehicles service of the vehicle to be activated, when the computer-readable instructions are executed by the one or more processors, the one or more processors further perform the following steps:

sending a prompt message of activation success to the application installed on the mobile terminal.

* * * * *